(12) United States Patent
Inaba (10) Patent No.: US 6,870,353 B2
(45) Date of Patent: Mar. 22, 2005

(54) POWER SUPPLY CONTROL CIRCUIT AND LSI USING THE SAME

(75) Inventor: Soichiro Inaba, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 329 days.

(21) Appl. No.: 09/983,789

(22) Filed: Oct. 25, 2001

(65) Prior Publication Data
US 2002/0097032 A1 Jul. 25, 2002

(30) Foreign Application Priority Data
Jan. 24, 2001 (JP) ........................................ 2001-016172

(51) Int. Cl.[7] .............................................. G05F 1/40
(52) U.S. Cl. ...................................... 323/282; 323/283
(58) Field of Search ................................. 323/282, 283, 323/284, 286, 285, 287, 288

(56) References Cited

U.S. PATENT DOCUMENTS 5,207,101 A * 5/1993 Haynes ......................... 73/597
6,157,182 A * 12/2000 Tanaka et al. ............... 323/284

* cited by examiner

Primary Examiner—Rajnikant B Patel
(74) Attorney, Agent, or Firm—Volentine Francos, PLLC (57) ABSTRACT

A power supply control circuit includes a comparator which compares the supply voltage (VDDV) with a predetermined reference voltage (VREF) and supplies a comparison signal (CMP) when the supply voltage (VDDV) reaches the reference voltage (VREF); and a controller which initiates wake-up operation of the circuit block in accordance with the comparison signal (CMP) of the comparator.

32 Claims, 6 Drawing Sheets

POWER SUPPLY CONTROL CIRCUIT AND LSI USING THE SAME

CROSS REFERENCE TO RELATED APPLICATION

This application claims the priority of Application No. 2001-16172, filed Jan. 24, 2001 in Japan, the subject matter of which is incorporated herein by reference.

TECHNICAL FIELD OF THE INVENTION

The present invention relates generally to a semiconductor integrated circuit (hereinafter referred to as LSI), and more particularly, to a power-saving control technology thereof.

BACKGROUND OF THE INVENTION

In a semiconductor integrated circuit, a power-supply control circuit performs a power-saving control of a circuit block. A conventional power-supply control circuit controls a power-supply voltage, a reset signal and a clock signal supplied to the circuit block, in accordance with a power-down request signal, a wake-up request signal and a clock signal, supplied from the circuit block and other circuits within the LSI. The power-supply control circuit includes a controller (control unit), a transistor, a counter and an OR gate (logical sum gate).

The control unit is a state machine which determines the state of a power-down signal a start signal and a stop signal to be outputted therefrom, in response to the state and timing of the clock signal, the power-down request signal and the wake-up request signal supplied thereto. The transistor controls on/off state of the power-supply voltage supplied to the circuit block in response to the power-down signal, supplied from the control unit. The counter counts the clock signal in response to the start signal, supplied from the control unit. The counter cancels the reset signal to the circuit block when the count value reaches a predetermined value. The OR gate provides a control of the clock signal to be supplied to the circuit block, in accordance with the stop signal supplied from the control unit.

In such an LSI, when the power-down request signal turns from high to low, the stop signal supplied from the control unit turns to high. This allows the clock signal, outputted from the OR gate, to keep being high in level, and stop to be supplied to the circuit block.

When several clocks are generated after the stop signal turns to high, the power-down signal, outputted from the control unit, turns from low to high in level. The transistor turns off and no power-supply voltage is supplied to the circuit block. As a result, the circuit block turns in the power-down state.

After that, when a request for operation is provided to the circuit block, the wake-up signal, outputted from another circuit within the LSI, turns low to high in level. The power-down signal and stop signal, both outputted from the control unit, turn to low. The start signal keeps being high in level for a predetermined period of time, and then turns to low.

When the power-down signal turns to "L", the transistor turns on. The power supply voltage starts being supplied to the circuit block and gradually increases in level. When the stop signal turns to "L", the clock signal starts being supplied to the circuit block.

On the other hand, when the start signal keeps being high for a predetermined period of time, the counter is reset, allowing the reset signal turns to low "L". As a result, the circuit block turns into a reset mode. When the start signal returns to low "L" after a predetermined period of time, the counter starts counting the clock signal. Then, when the count value of the counter reaches a predetermined value, the reset signal supplied to the circuit block turns to high "H". As a result, the reset state (reset mode) is cancelled, allowing the circuit block to start its operation.

The reset mode of the circuit block is cancelled after a predetermined period of time since the power-supply voltage starts being supplied to the circuit block, so that the circuit block operates in a wake-up mode reliably.

However, according to the above-described conventional LSI, the time, taken to stabilize the power-supply voltage in the wake-up mode, is dependent on a fixed value of the counter. This fixed value defines the time taken to securely stabilize the power-supply voltage in view of variations in the characteristics of the circuit block. Accordingly, the fixed value is a value allowing for an excessive margin for the actual time required to reach the voltage capable of the circuit operation. This made difficult a prompt resumption of the circuit operation after receipt of the wake-up request signal.

OBJECTS OF THE INVENTION

Accordingly, it is an object of the present invention to provide a power supply control circuit in which a circuit block can turn into an in-operation mode from a power down mode at a higher speed.

Additional objects, advantages and novel features of the present invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

It is therefore the object of the present invention to overcome the above drawback involved in the prior art and to provide an LSI having a power-saving control function capable of prompt resumption of the circuit operation after receipt of a wake-up request.

According to a first aspect of the present invention, a power supply control circuit includes a power supply circuit supplying a supply voltage (VDDV) to a circuit block; a comparator which compares the supply voltage (VDDV) with a predetermined reference voltage (VREF) and supplies a comparison signal (CMP) when the supply voltage (VDDV) reaches the reference voltage (VREF); and a controller which initiates wake-up operation of the circuit block in accordance with the comparison signal (CMP) of the comparator.

According to a second aspect of the present invention, a power supply control circuit further includes a divider which divides the first clock signal (CLKI) by a predetermined dividing ratio to provide a second clock signal (CLK) to be supplied to the circuit block; and a reference voltage generating circuit which generates the reference voltage (VREF) to be supplied to the comparator in accordance with the dividing ratio.

According to a third aspect of the present invention, a power supply control circuit further includes a delay circuit which generates a third clock signal (CLKD) delayed by a predetermined timing from the first clock signal (CLK); and a subject voltage generating circuit which generates a subject voltage (VI) corresponding to the phase difference between the first and third clock signals so that the subject voltage (VI) is compared with the reference voltage (VREF) by the comparator.

DETAILED DISCLOSURE OF THE INVENTION

In the following detailed description of the preferred embodiments, reference is made to the accompanying drawings which form a part hereof, and in which is shown by way of illustration specific preferred embodiments in which the inventions may be practiced. These preferred embodiments are described in sufficient detail to enable those skilled in the art to practice the invention, and it is to be understood that other preferred embodiments may be utilized and that logical, mechanical and electrical changes may be made without departing from the spirit and scope of the present inventions. The following detailed description is, therefore, not to be taken in a limiting sense, and scope of the present inventions is defined only by the appended claims.

Figure 1:
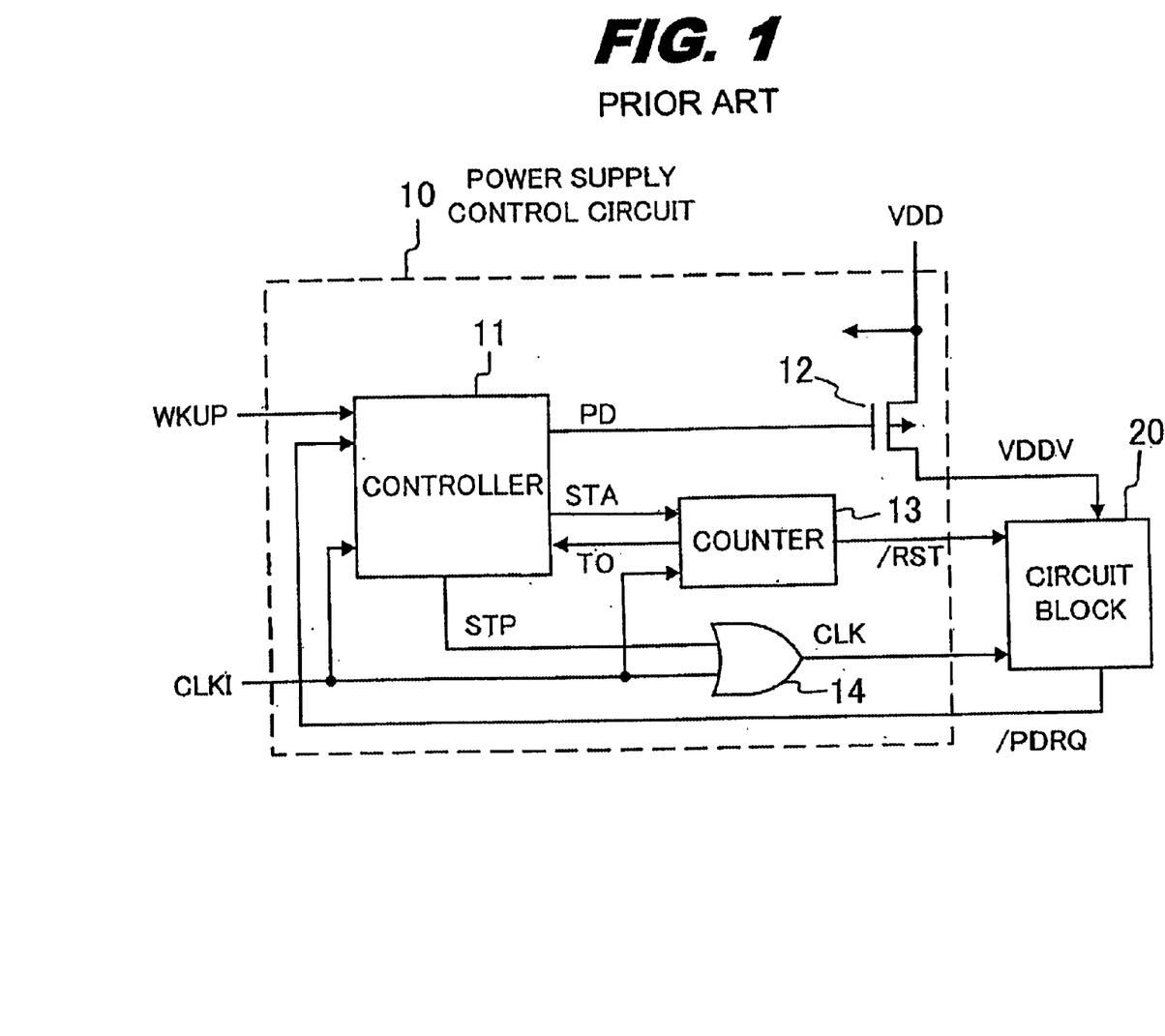
FIG. 1 is a block diagram illustrating a conventional LSI using a power supply control circuit.

For better understanding of the present invention, a conventional technology is first described. FIG. 1 shows a block diagram showing a conventional LSI having a power-saving control circuit. This LSI includes a power-supply control circuit 10 which perform a power-saving control, and a circuit block 20 to be controlled by the power-supply control circuit 10.

The power-supply control circuit 10 controls a power-supply voltage VDDV, a reset signal /RST and a clock signal CLK supplied to the circuit block 20, in accordance with a power-down request signal /PDRQ ("/" means inversion), a wake-up request signal WKUP and a clock signal CLKI, supplied from the circuit block 20 and other circuits within the LSI. The power-supply control circuit 10 includes a control unit 11, a transistor 12, a counter 13 and an OR gate (logical sum gate) 14.

The control unit 11 is a state machine which determines the state of a power-down signal PD, a start signal STA and a stop signal STP to be outputted therefrom, in response to the state and timing of the clock signal CLKI, the power-down request signal /PDRQ and the wake-up request signal WKUP supplied thereto.

The transistor 12 controls on/off state of the power-supply voltage VDDV supplied to the circuit block 20 in response to the power-down signal PD, supplied from the control unit 11. The counter 13 counts the clock signal CLKI in response to the start signal STA, supplied from the control unit 11. The counter 13 cancels the reset signal /RST to the circuit block 20 when the count value reaches a predetermined value. The OR gate 14 provides a control of the clock signal CLK, to be supplied to the circuit block 20, in accordance with the stop signal STP supplied from the control unit 11.

In such an LSI, when the power-down request signal /PDRQ turns from high to low, the stop signal STP supplied from the control unit 11 turns high. This allows the clock signal CLK, outputted from the OR gate 14, to keep being high in level, and stop to be supplied to the circuit block 20.

When several clocks are generated after the stop signal STP turns high, the power-down signal PD, outputted from the control unit 11, turns from low to high in level. The transistor 12 turns off and no power-supply voltage is supplied to the circuit block 20. As a result, the circuit block 20 turns in the power-down state.

After that, when a request for operation is provided to the circuit block 20, the wake-up signal WKUP, outputted from another circuit within the LSI, turns low to high in level. The power-down signal PD and stop signal STP, both outputted from the control unit 11, turn to low. The start signal STA keeps being high in level for a predetermined period of time, and then turns to low.

When the power-down signal PD turns to "L", the transistor 12 turns on. The power supply voltage VDDV starts being supplied to the circuit block 20 and gradually increases in level. When the stop signal STP turns to "L", the clock signal CLK starts to be supplied to the circuit block 20.

On the other hand, when the start signal STA keeps being high for a predetermined period of time, the counter 13 is reset, allowing the reset signal /RST turns to low "L". As a result, the circuit block 20 turns into a reset mode. When the start signal STA returns to low "L" after a predetermined period of time, the counter 13 starts counting the clock signal CLKI. Then, when the count value of the counter 13 reaches a predetermined value, the reset signal /RST supplied to the circuit block 20 turns to high "H". As a result, the reset state (reset mode) is cancelled, allowing the circuit block 20 to start its operation.

The reset mode of the circuit block 20 is cancelled after a predetermined period of time since the power-supply voltage VDDV starts being supplied to the circuit block 20, so that the circuit block 20 operates in a wake-up mode reliably.

However, according to the above-described conventional LSI, the time, taken to stabilize the power-supply voltage VDDV in the wake-up mode, is dependent on a fixed value of the counter 13. This fixed value defines the time taken to securely stabilize the power-supply voltage VDDV in view of variations in the characteristics of the circuit block 20. Accordingly, the fixed value is a value allowing for an excessive margin for the actual time required to reach the voltage capable of the circuit operation. This made difficult a prompt resumption of the circuit operation after receipt of the wake-up request signal "WKUP".

Figure 2:
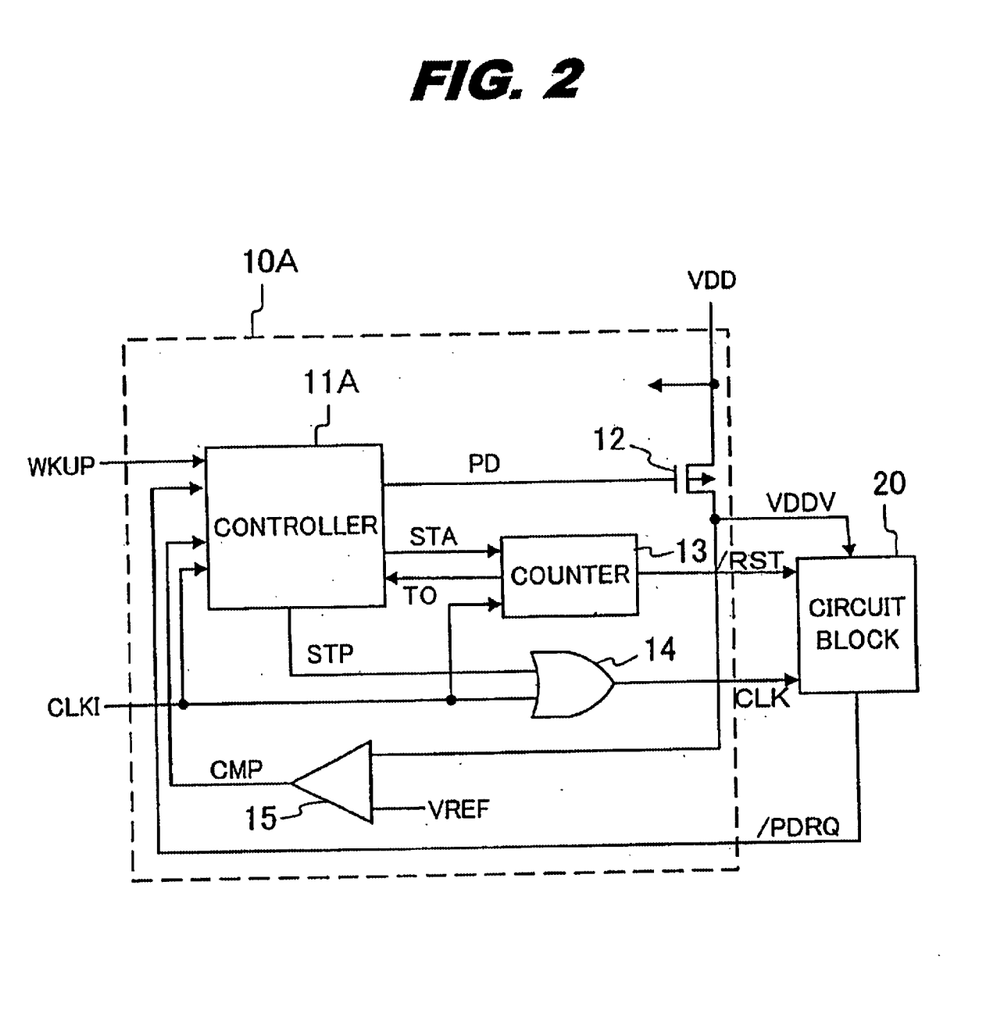
FIG. 2 is a block diagram illustrating an LSI using a power supply control circuit according to a first preferred embodiment of the present invention.

FIG. 2 shows an LSI according to a first preferred embodiment of the present invention, in which identical or similar elements to those in FIG. 1 are designated by the same or like reference numerals.

This LSI includes a power-supply control circuit 10A for providing a power-saving control depending on the state (mode) of operations, and a circuit block 20 subjected to power saving. The power supply control circuit 10A controls the circuit block 20 to be in a power down mode and in an in-operation mode.

The power supply control circuit 10A includes a controller 11A; a comparator 15 which compares a supply voltage VDDV with a predetermined reference voltage VREF; a counter 13 which counts a clock signal CLKI; a transistor 12; and a OR gate 14.

The controller 11A is supplied with a wake-up signal WKUP and a first clock signal CLKI. The controller 11A is connected at output terminals to a gate of the transistor 12, an input terminal of the counter 13 and an input terminal of the OR gate 14. The transistor 12 is connected at a source to a power supply VDD and at a drain to an input terminal of the circuit block 20 and an input terminal of the comparator 15. The counter 13 is connected at output terminals to an input terminal of the controller 11A and an input terminal of the circuit block 20; and is supplied with the clock signal CLKI. The OR gate 14 is connected at an output terminal to an input terminal of the circuit block 20. The comparator 15 is supplied with a reference voltage signal VREF, and is connected at an output terminal to an input terminal of the controller 11A. The circuit block 20 is connected at an output terminal to an input terminal of the controller 11A.

The comparator 15 supplies a comparison signal CMP when the supply voltage VDDV reaches the reference voltage VREF. The controller 11A initiates wake-up operation of the circuit block in accordance with the comparison signal CMP of the comparator 15. The counter 13 counts first clock signals CLKI and supplies an operation requesting signal /RST to the circuit block 20 when a predetermined number of the first clock signals CLKI are counted. The controller 11A controls the counter 13 to start counting the first clock signals CLKI in response to the comparison signal CMP of the comparator 15. The circuit block 20 turns into an in-operation mode in response to the operation requesting signal /RST.

The power-supply control circuit 10A controls a power-supply voltage VDDV, a reset signal /RST and a clock signal CLK which are supplied to the circuit block 20, based on a power-down request signal /PDRQ, a wake-up request signal WKUP in a wake-up mode and a clock signal CLKI providing an operation reference of the entire LSI. The power-down request signal /PDRQ, wake-up request signal WKUP and clock signal CLKI are supplied from the circuit block 20 and other circuits within the LSI.

The control unit 11A is a state machine which determines the state of a power-down signal PD, a start signal STA and a stop signal STP to be outputted therefrom, in response to the state and timing of the clock signal CLKI, the power-down request signal /PDRQ, a count completion signal TO, the wake-up request signal WKUP and a comparison signal CMP.

When the circuit block 20 is in ordinary or normal in-operation mode, i.e., the power-down request signal /PDRQ is high, the control unit 11A sets the power-down signal PD, the start signal STA and the stop signal STP low "L" for output. When the power-down request signal /PDRQ turns to low "L", the control unit 11A sets the stop signal STP high "H", and after several clocks, sets the power-down signal PD high "H".

On the contrary, when the wake-up request signal WKUP turns to high "H" while the circuit block 20 is in a power-down mode, i.e., the power-down signal PD is high "H", the control unit 11A sets the power-down signal PD and the stop signal STP low "L". Thereafter, at the time when the comparison signal CMP turns to high "H", the control unit 11A sets the start signal STA high for a certain period of time.

The transistor 12 is a switch providing on/off control of the power-supply voltage VDDV supplied to the circuit block 20, in response to low/high of the power-down signal PD outputted from the control unit 11A. The counter 13 sets the reset signal /RST when the start signal STA outputted from the control unit 11A turns low "L" to high "H", and starts its counting operation of the clock signal CLKI when the start signal STA turns low "L" to high "H". The counter 13, when the counter value reaches a predetermined value, supplies a count completion signal TO and cancels the reset signal /RST supplied to the circuit block 20.

The OR gate 14 provides control of the clock signal CLK supplied to the circuit block 20 on the basis of the stop signal STP supplied from the control unit 11A. The comparator 15 compares the power-supply voltage VDDV supplied via the transistor 12 to the circuit block 20 with the reference voltage VREF ensuring a normal operation of the circuit block 20. When the power-supply voltage VDDV does not reach the reference voltage VREF, the comparison signal CMP outputted from the comparator 15 turns to low "L" whereas when the power-supply voltage VDDV becomes equal to or higher than the reference voltage VREF, the comparison signal CMP turns to high "H".

Figure 3:
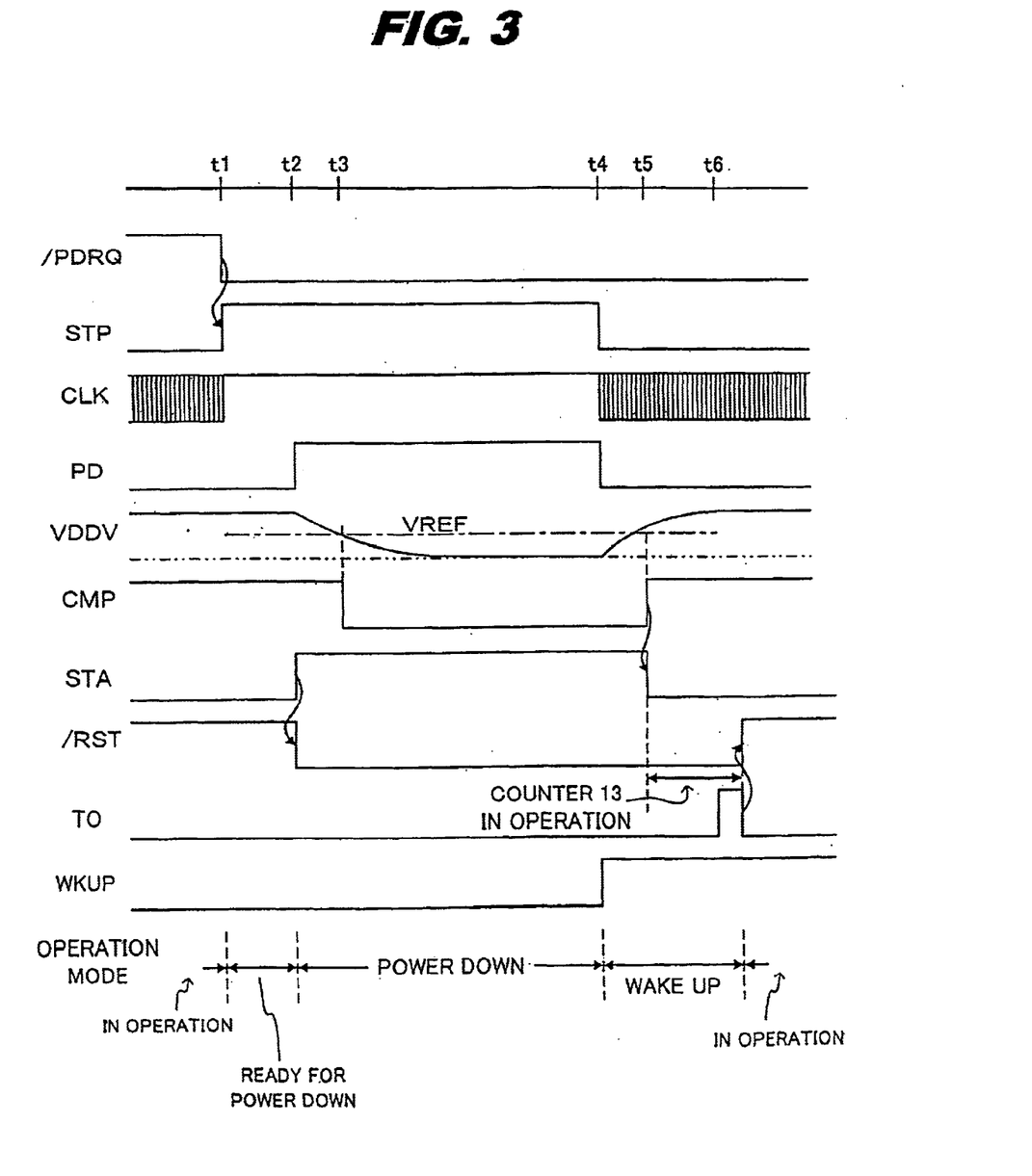
FIG. 3 is a timing chart showing the operation of the first preferred embodiment.

FIG. 3 is a timing chart showing signal waveforms for the first preferred embodiment, shown in FIG. 2. Hereinafter, referring to FIG. 3, the operations of the LSI of FIG. 2 will be described.

As shown in FIG. 3, the circuit block 20 included in the LSI has four operation modes of "in-operation", "ready for power-down", "power-down" and "wake-up".

When the operation of the circuit block 20 in the operation mode comes to an end at the time t1, the power-down request signal /PDRQ for entering the power-down mode turns high "H" to low "L". The circuit block 20 turns into the "ready for power-down" mode, so that the stop signal STP outputted from the control unit 11A turns to high "H" and the clock signal CLK, supplied from the OR gate 14, is fixed or maintained at high "H". As a result, the clock signal CLK stops being supplied to the circuit block 20.

At the time t2, after several clocks from the time t1, the power-down signal PD outputted from the control unit 11A turns low "L" to high "H" and the start signal STA turns low "L" to high "H". When the power-down signal PD becomes high "H", the transistor 12 turns into off-state, and the power-supply voltage VDDV stops being supplied to the circuit block 20. When the start signal STA becomes high "H", the reset signal /RST outputted from the counter 13 turns to low "L". As a result, the circuit block 20 turns into the "power-down" mode. The power-supply voltage VDDV gradually lowers without immediately falling to zero volt, due to e.g., capacitance of the power-supply circuit of the circuit block 20.

When the power-supply voltage VDDV lowers to the reference voltage VREF or below at the time t3, the comparison signal CMP outputted from the comparator 15 turns to low "L".

When a request for operation to the circuit block 20 is issued from another circuit within the LSI at the time t4, the wake-up request signal WKUP turns low "L" to high "H". The circuit block 20 turns into the "wake-up" mode, so that both the power-down signal PD and stop signal STP outputted from the control unit 11A turn to low "L".

When the stop signal STP turns to low "L", the clock signal CLK stops being supplied via the OR gate 14 to the circuit block 20. When the power-down signal PD turns to low "L", the transistor 12 turns into on-state. As a result, the power supply to the circuit block 20 is started and the power-supply voltage VDDV gradually increases.

When the power-supply voltage VDDV increases to the reference voltage VREF at the time t5, the comparison signal CMP outputted from the comparator 15 turns to high "H". This allows the start signal STA outputted from the control unit 11A to turn to low "L". When the tart signal STA turns to low "L", the counter 13 starts its counting operation of the clock signal CLKI.

When the count value of the counter 13 reaches a predetermined value at the time t6, the counter 13 supplies a pulsed count completion signal TO and sets the reset signal /RST to the circuit block 20 high "H". This allows the circuit block 20 to be released from the reset state to start its operation, turning into the "operation" mode.

As set forth hereinabove, the LSI of the first preferred embodiment includes the comparator 15 for monitoring the power-supply supply voltage VDDV supplied to the circuit block 20 in the wake-up mode. For this reason, after the power-supply voltage VDDV has reached the reference voltage VREF, the reset signal /RST can be cancelled to make the circuit block 20 operable, thereby ensuring a rapid and secure wake-up operation.

Figure 4:
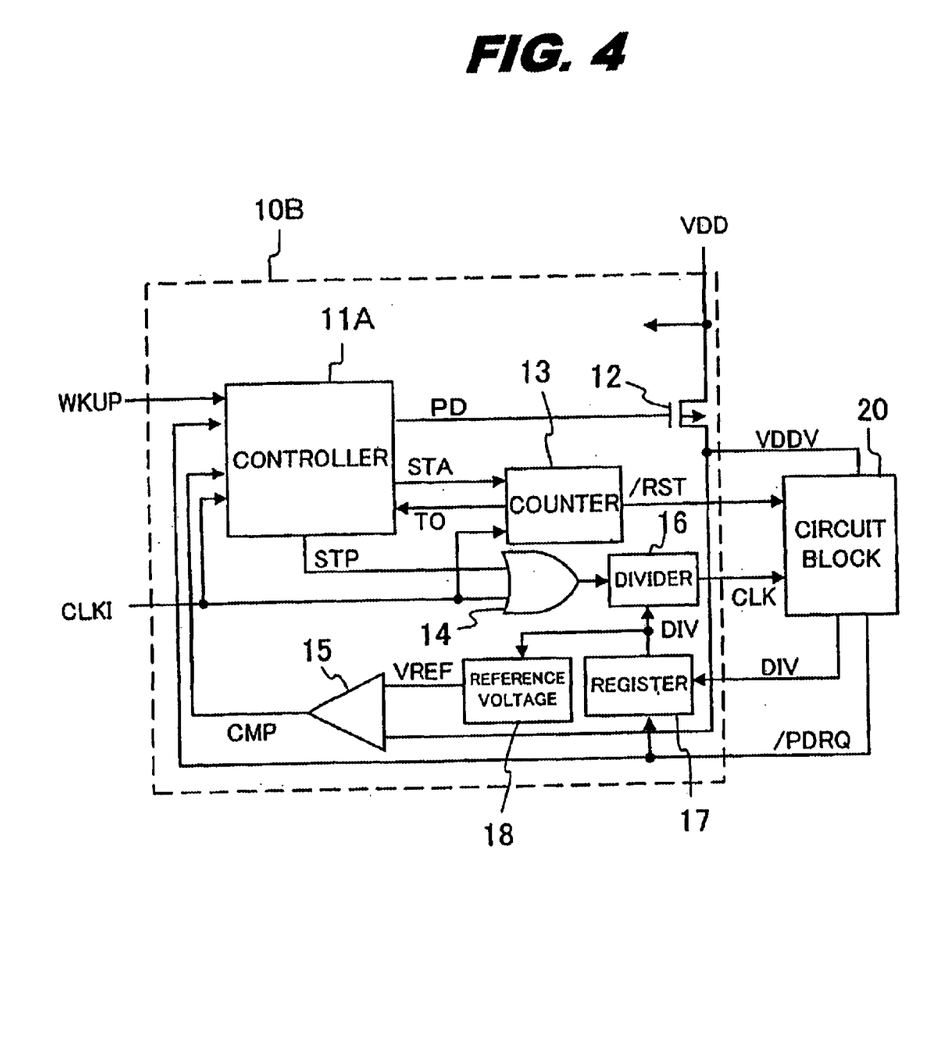
FIG. 4 is a block diagram illustrating an LSI using a power supply control circuit according to a second preferred embodiment of the present invention.

FIG. 4 shows an LSI according to a second preferred embodiment of the present invention, in which identical or similar elements to those in FIGS. 1 and 2 are designated by the same or like reference numerals. This LSI includes a power-supply control circuit 10B, which is different in configuration from the power-supply control circuit 10A, shown in FIG. 2.

This LSI includes a power-supply control circuit 10B for providing a power-saving control depending on the state (mode) of operations, and a circuit block 20 subjected to power saving. The power supply control circuit 10B controls the circuit block 20 to be in a power down mode and in an in-operation mode.

The power supply control circuit 10B includes a power supply circuit, not shown, for supplying a supply voltage VDDV to the circuit block 20; a controller 11A; a divider 16; a register 17; a reference voltage generating circuit 18, which generates a reference voltage VREF; a comparator 15 which compares the supply voltage VDDV with the reference voltage VREF; a counter 13 which counts a clock signal CLKI; a transistor 12; and a OR gate 14.

The controller 11A is supplied with a wake-up signal WKUP and a first clock signal CLKI. The controller 11A is connected at output terminals to a gate of the transistor 12, an input terminal of the counter 13 and an input terminal of the OR gate 14. The transistor 12 is connected at a source to a power supply VDD and at a drain to an input terminal of the circuit block 20 and an input terminal of the comparator 15. The counter 13 is connected at output terminals to an input terminal of the controller 11A and an input terminal of the circuit block 20; and is supplied with the clock signal CLKI. The OR gate 14 is connected at an output terminal to an input terminal of the divider 16. The divider 16 is connected at an input terminal to an output terminal of the register 17, and at an output terminal to an input terminal of the circuit block 20. The comparator 15 is connected at an input terminal to an output terminal of the reference voltage generating circuit 18, and at an output terminal to an input terminal of the controller 11A. The circuit block 20 is connected at an output terminal to an input terminal of the controller 11A. The register 17 is connected at input terminals to output terminals of the circuit block 20, and at an output terminal to the divider 16 and the reference voltage generating circuit 18.

The comparator 15 supplies a comparison signal CMP when the supply voltage VDDV reaches the reference voltage VREF. The controller 11A initiates wake-up operation of the circuit block in accordance with the comparison signal CMP of the comparator 15. The counter 13 counts first clock signals CLKI and supplies an operation requesting signal /RST to the circuit block 20 when a predetermined number of the first clock signals CLKI are counted. The controller 11A controls the counter 13 to start counting the first clock signals CLKI in response to the comparison signal CMP of the comparator 15. The circuit block 20 turns into an in-operation mode in response to the operation requesting signal /RST.

The power-supply control circuit 10B controls a power-supply voltage VDDV, a reset signal /RST and a clock signal CLK which are supplied to the circuit block 20, based on a power-down request signal /PDRQ, a wake-up request signal WKUP in a wake-up mode and a clock signal CLKI providing an operation reference of the entire LSI. The power-down request signal /PDRQ, wake-up request signal WKUP and clock signal CLKI are supplied from the circuit block 20 and other circuits within the LSI.

The control unit 11A is a state machine which determines the state of a power-down signal PD, a start signal STA and a stop signal STP to be outputted therefrom, in response to the state and timing of the clock signal CLKI, the power-down request signal /PDRQ, a count completion signal TO, the wake-up request signal WKUP and a comparison signal CMP.

When the circuit block 20 is in ordinary or normal in-operation mode, i.e., the power-down request signal /PDRQ is high, the control unit 11A sets the power-down signal PD, the start signal STA and the stop signal STP low "L" for output. When the power-down request signal /PDRQ turns to low "L", the control unit 11A sets the stop signal STP high "H", and after several clocks, sets the power-down signal PD high "H".

On the contrary, when the wake-up request signal WKUP turns to high "H" while the circuit block 20 is in a power-down mode, i.e., the power-down signal PD is high "H", the control unit 11A sets the power-down signal PD and the stop signal STP low "L". Thereafter, at the time when the comparison signal CMP turns to high "H", the control unit 11A sets the start signal STA high for a certain period of time.

The transistor 12 is a switch providing on/off control of the power-supply voltage VDDV supplied to the circuit block 20, in response to low/high of the power-down signal PD outputted from the control unit 11A. The counter 13 sets the reset signal /RST when the start signal STA outputted from the control unit 11A turns low "L" to high "H", and starts its counting operation of the clock signal CLKI when the start signal STA turns low "L" to high "H". The counter 13, when the counter value reaches a predetermined value, supplies a count completion signal TO and cancels the reset signal /RST supplied to the circuit block 20.

The OR gate 14 provides control of the clock signal CLK supplied to the circuit block 20 on the basis of the stop signal STP supplied from the control unit 11A. The comparator 15 compares the power-supply voltage VDDV supplied via the transistor 12 to the circuit block 20 with the reference voltage VREF ensuring a normal operation of the circuit block 20. When the power-supply voltage VDDV does not reach the reference voltage VREF, the comparison signal CMP outputted from the comparator 15 turns to low "L" whereas when the power-supply voltage VDDV becomes equal to or higher than the reference voltage VREF, the comparison signal CMP turns to high "H".

The divider 16 divides a clock signal outputted from the OR gate 14, on the basis of a dividing ratio DIV supplied from the register 17, to generate a clock signal CLK to be supplied to the circuit block 20. The register 17 stores the dividing ratio DIV supplied from the circuit block 20 and supplies the dividing ratio DIV to the divider 16 and to the reference voltage generating circuit 18. The reference voltage generating circuit 18 generates a reference voltage VREF corresponding to the dividing ratio DIV supplied from the register 17, and supplies such the reference voltage VREF to the comparator 15. The other features are the same as those of the LSI shown in FIG. 2.

The dividing ratio DIV is supplied from the circuit block 20 to the register 17 while the circuit block 20 is in "operation" mode. Then, the dividing ratio DIV stored in the register 17 is supplied to the divider 16 and the reference voltage generating circuit 18 while the circuit block 20 is in "wake-up" mode. In the "wake-up" mode, a clock signal CLK of a lower speed than upon the ordinary operation is supplied to the circuit block 20. The comparator 15 accepts a lower reference voltage VREF than the reference voltage upon the ordinary operation, correspondingly to the clock signal CLK of a lower speed.

Since the reference voltage VREF supplied to the comparator 15 is set to a lower value than upon the ordinary operation, the comparison signal CMP outputted from the comparator 15 turns to high "H" before the power-supply voltage VDDV of the circuit block 20 reaches a predetermined value. This allows the circuit block 20 to turns into "operation" mode before the power-supply voltage VDDV reaches the predetermined value. At that time, the clock signal CLK is of a lower speed than upon the ordinary operation, and hence the circuit block 20 performs a normal operation based on this clock signal CLK.

As set forth hereinabove, the LSI of the second preferred embodiment includes the reference voltage generating circuit 18 for generating a reference voltage VREF whose value is lower than upon the ordinary operation while the circuit block 20 is in "wake-up mode. The LSI further includes the divider 16 in order to supply a clock signal CLK of a lower speed than upon the ordinary operation to the circuit block 20 during the wake-up mode. This provides the advantage that a rapider shift to the "operation" mode is possible without incurring any malfunctions of the circuit block 20. Furthermore, due to its capability to set the dividing ratio DIV to any value, optimum wake-up time can advantageously be set depending on a desired operation speed.

Figure 5:
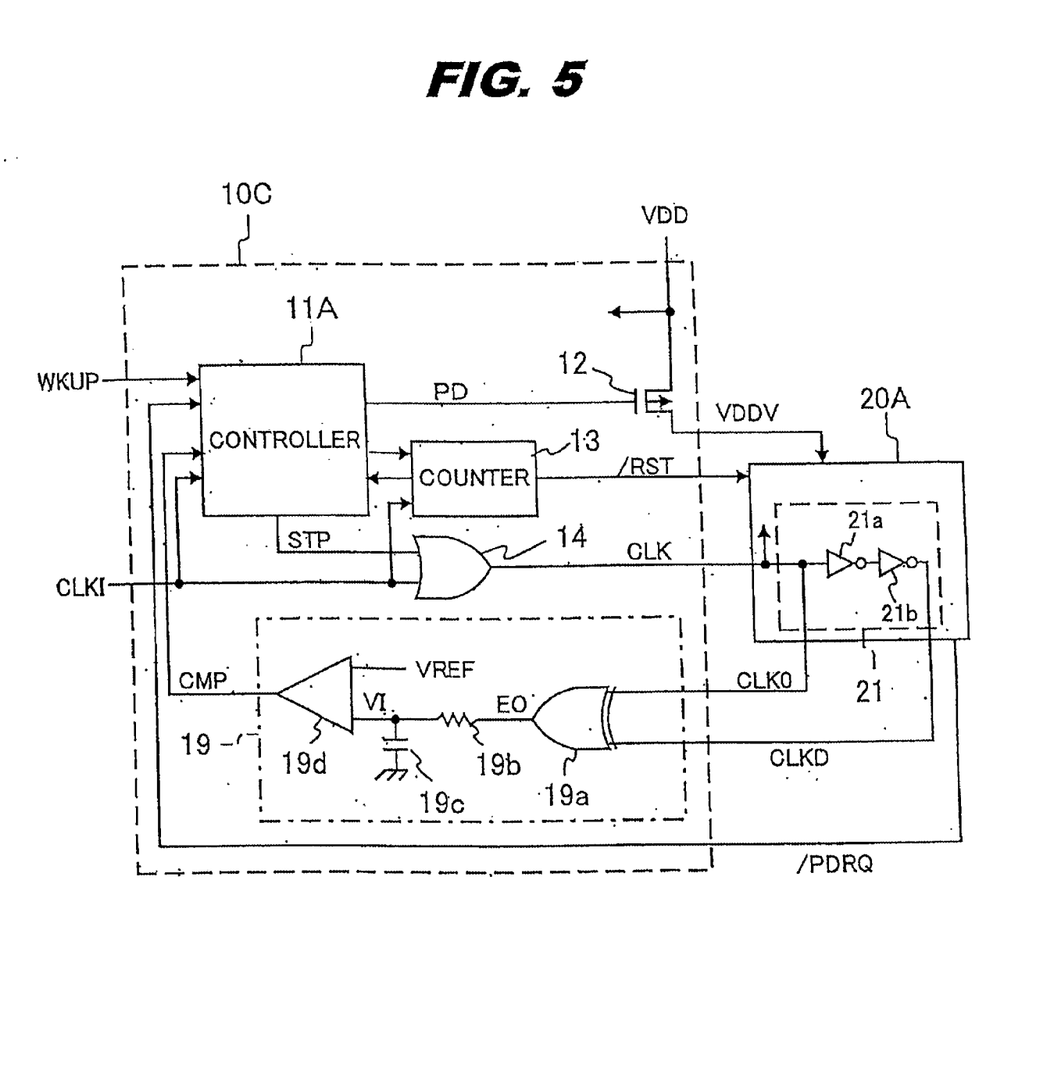
FIG. 5 is a block diagram illustrating an LSI using a power supply control circuit according to a third preferred embodiment of the present invention.

FIG. 5 shows an LSI according to a third preferred embodiment of the present invention, in which identical or similar elements to those in FIGS. 2 and 4 are designated by the same or like reference numerals.

This LSI includes a power-supply control circuit 10C for providing a power-saving control depending on the state (mode) of operations, and a circuit block 20A subjected to power saving. The power supply control circuit 10C controls the circuit block 20A to be in a power down mode and in an in-operation mode.

The power supply control circuit 10C includes a power supply circuit, not shown, for supplying a supply voltage VDDV to a circuit block 20A; a controller 11A; a monitor unit 19; a counter 13 which counts a clock signal CLKI; a transistor 12; and a OR gate 14.

The controller 11A is supplied with a wake-up signal WKUP and a first clock signal CLKI. The controller 11A is connected at output terminals to a gate of the transistor 12, an input terminal of the counter 13 and an input terminal of the OR gate 14. The transistor 12 is connected at a source to a power supply VDD and at a drain to an input terminal of the circuit block 20A. The counter 13 is connected at output terminals to an input terminal of the controller 11A and an input terminal of the circuit block 20; and is supplied with the clock signal CLKI. The OR gate 14 is connected at an output terminal to an input terminal of the circuit block 20A.

The circuit block 20A is connected at output terminals to input terminals of the controller 11A and monitoring unit 19. The monitoring unit 19 is connected at an output terminal to an input terminal of the controller 11A.

The circuit block 20A includes delay circuit 21 for detecting a delay time which may vary depending on the power-supply voltage VDDV, in addition to the circuit having an ordinary function. The delay circuit 21 provides as its output a clock signal CLK0 which is an intact return of the clock signal CLK supplied from the power-supply control circuit 10C, and a clock signal CLKD obtained by delaying the clock signal CLK through two-stage inverters 21a and 21b.

The monitoring unit 19 detects the delay time of the delay circuit 21 on the basis of the phase difference between the two clock signals CLK0 and CLKD outputted from the delay circuit 21. The monitoring unit 19 outputs a comparison signal CMP of high "H", when the delay time is in a reference range of time.

The monitoring unit 19 includes an EOR (exclusive logical sum gate) 19a which is supplied with the two clock signals CLK0 and CLKD to output a pulse EO having a pulse width which depends on the phase difference between the clock signals CLK0 and CLKD. The monitoring unit 19 also includes a resistor 19b and a capacitor 19c for integrating the pulse EO, and a comparator 19d for comparing the integrated voltage VI with the reference voltage VREF. The other features are the same as those of the first preferred embodiment of FIG. 2.

The power-supply control circuit 10C controls a power-supply voltage VDDV, a reset signal /RST and a clock signal CLK which are supplied to the circuit block 20A, based on a power-down request signal /PDRQ, a wake-up request signal WKUP in a wake-up mode and a clock signal CLKI providing an operation reference of the entire LSI. The power-down request signal /PDRQ, wake-up request signal WKUP and clock signal CLKI are supplied from the circuit block 20A and other circuits within the LSI.

The control unit 11A is a state machine which determines the state of a power-down signal PD, a start signal STA and a stop signal STP to be outputted therefrom, in response to the state and timing of the clock signal CLKI, the power-down request signal /PDRQ, a count completion signal TO, the wake-up request signal WKUP and a comparison signal CMP.

When the circuit block 20 is in ordinary or normal in-operation mode, i.e., the power-down request signal /PDRQ is high, the control unit 11A sets the power-down signal PD, the start signal STA and the stop signal STP low "L" for output. When the power-down request signal /PDRQ turns to low "L", the control unit 11A sets the stop signal STP high "H", and after several clocks, sets the power-down signal PD high "H".

On the contrary, when the wake-up request signal WKUP turns to high "H" while the circuit block 20A is in a power-down mode, i.e., the power-down signal PD is high "H", the control unit 11A sets the power-down signal PD and the stop signal STP low "L". Thereafter, at the time when the comparison signal CMP turns to high "H", the control unit 11A sets the start signal STA high for a certain period of time.

The transistor 12 is a switch providing on/off control of the power-supply voltage VDDV supplied to the circuit block 20A, in response to low/high of the power-down signal PD outputted from the control unit 11A. The counter 13 sets the reset signal /RST when the start signal STA outputted from the control unit 11A turns low "L" to high "H", and starts its counting operation of the clock signal CLKI when the start signal STA turns low "L" to high "H". The counter 13, when the counter value reaches a predetermined value, supplies a count completion signal TO and cancels the reset signal /RST supplied to the circuit block 20A. The OR gate 14 provides control of the clock signal CLK supplied to the circuit block 20A on the basis of the stop signal STP supplied from the control unit 11A.

In the "wake-up" mode, as the power-supply voltage VDDV supplied to the circuit block 20A increases, the operation speed of the pseudo delay circuit 21 increases. As a result, the phase difference between the clock signals CLK0 and CLKD becomes smaller with reduced pulse width of the pulse EO outputted from the EOR 19a in the monitoring unit 19, and therefore, the integrated voltage VI gradually decreases. Then, when the voltage VI falls to the predetermined reference voltage VREF or below, the comparison signal CMP outputted from the comparator 19d turns to high "H". The subsequent operations are substantially the same as in the first preferred embodiment, shown in FIG. 2.

As set forth hereinabove, the LSI of the third preferred embodiment has the pseudo delay circuit 21 for actually measuring the delay time (operation speed) within the circuit block 20A, and the monitoring unit 19. This provides the advantages in that the operable timing of the circuit block 20A can be detected with a high accuracy so that the wake-up time can further be reduced.

Figure 6:
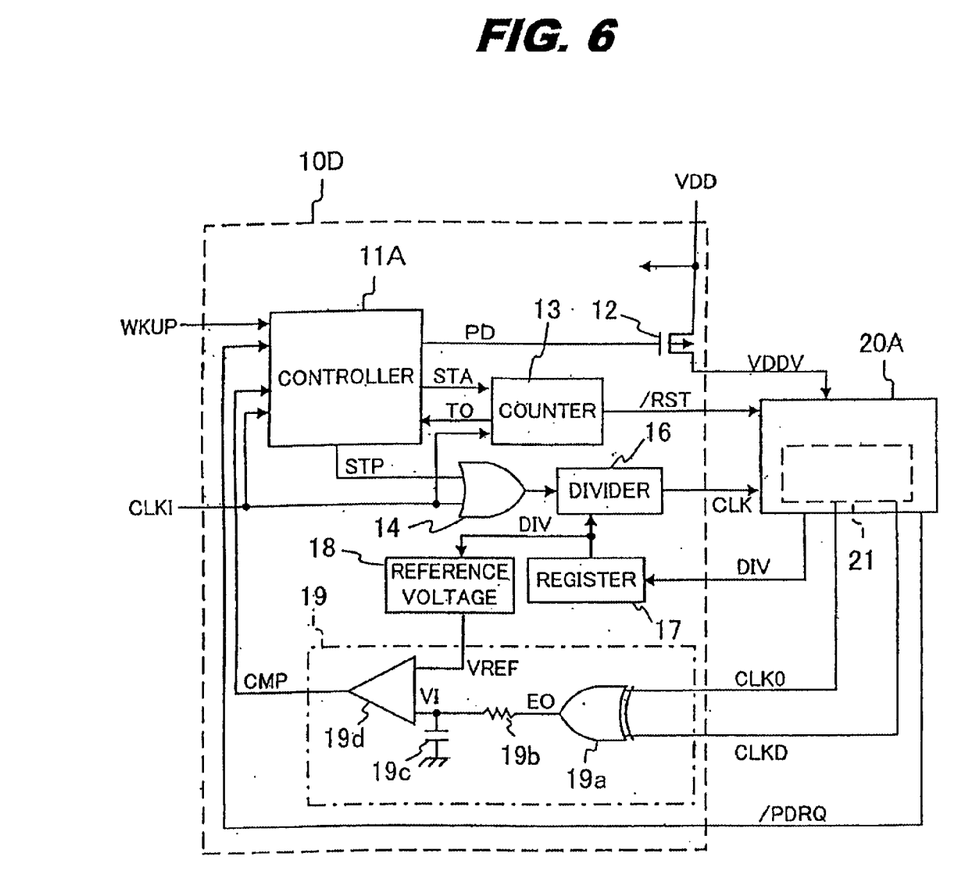
FIG. 6 is a block diagram illustrating an LSI using a power supply control circuit according to a fourth preferred embodiment of the present invention.

FIG. 6 shows an LSI according to a fourth preferred embodiment of the present invention, in which identical or similar elements to those in FIGS. 2, 4 and 5 are designated by the same or like reference numerals.

This LSI includes a power-supply control circuit 10D for providing a power-saving control depending on the state (mode) of operations, and a circuit block 20A subjected to power saving. The power supply control circuit 10D controls the circuit block 20A to be in a power down mode and in an in-operation mode.

The power supply control circuit 10D includes a power supply circuit, not shown, for supplying a supply voltage VDDV to the circuit block 20A; a controller 11A; a divider 16; a register 17; a reference voltage generating circuit 18, which generates a reference voltage VREF; a monitoring unit 19; a counter 13 which counts a clock signal CLKI; a transistor 12; and a OR gate 14.

The controller 11A is supplied with a wake-up signal WKUP and a first clock signal CLKI. The controller 11A is connected at output terminals to a gate of the transistor 12, an input terminal of the counter 13 and an input terminal of the OR gate 14. The transistor 12 is connected at a source to a power supply VDD and at a drain to an input terminal of the circuit block 20A. The counter 13 is connected at output terminals to an input terminal of the controller 11A and an input terminal of the circuit block 20A; and is supplied with the clock signal CLKI. The OR gate 14 is connected at an output terminal to an input terminal of the divider 16. The divider 16 is connected at an input terminal to an output terminal of the register 17, and at an output terminal to an input terminal of the circuit block 20A. The monitoring circuit 19 is connected at an input terminal to an output terminal of the reference voltage generating circuit 18, and at an output terminal to an input terminal of the controller 11A. The circuit block 20A is connected at an output terminal to an input terminal of the controller 11A. The register 17 is connected at input terminals to output terminals of the circuit block 20A, and at an output terminal to the divider 16 and the reference voltage generating circuit 18.

The controller 11A initiates wake-up operation of the circuit block in accordance with the comparison signal CMP supplied from the monitoring unit 19. The counter 13 counts first clock signals CLKI and supplies an operation requesting signal /RST to the circuit block 20A when a predetermined number of the first clock signals CLKI are counted. The controller 11A controls the counter 13 to start counting the first clock signals CLKI in response to the comparison signal CMP supplied from the monitoring unit 19. The circuit block 20A turns into an in-operation mode in response to the operation requesting signal /RST.

The power-supply control circuit 10D controls a power-supply voltage VDDV, a reset signal /RST and a clock signal CLK which are supplied to the circuit block 20A, based on a power-down request signal /PDRQ, a wake-up request signal WKUP in a wake-up mode and a clock signal CLKI providing an operation reference of the entire LSI. The power-down request signal /PDRQ, wake-up request signal WKUP and clock signal CLKI are supplied from the circuit block 20A and other circuits within the LSI.

The control unit 11A is a state machine which determines the state of a power-down signal PD, a start signal STA and a stop signal STP to be outputted therefrom, in response to the state and timing of the clock signal CLKI, the power-down request signal /PDRQ, a count completion signal TO, the wake-up request signal WKUP and a comparison signal CMP.

When the circuit block 20A is in ordinary or normal in-operation mode, i.e., the power-down request signal /PDRQ is high, the control unit 11A sets the power-down signal PD, the start signal STA and the stop signal STP low "L" for output. When the power-down request signal /PDRQ turns to low "L", the control unit 11A sets the stop signal STP high "H", and after several clocks, sets the power-down signal PD high "H".

On the contrary, when the wake-up request signal WKUP turns to high "H" while the circuit block 20A is in a power-down mode, i.e., the power-down signal PD is high "H", the control unit 11A sets the power-down signal PD and the stop signal STP low "L". Thereafter, at the time when the comparison signal CMP turns to high "H", the control unit 11A sets the start signal STA high for a certain period of time.

The transistor 12 is a switch providing on/off control of the power-supply voltage VDDV supplied to the circuit block 20A, in response to low/high of the power-down signal PD outputted from the control unit 11A. The counter 13 sets the reset signal /RST when the start signal STA outputted from the control unit 11A turns low "L" to high "H", and starts its counting operation of the clock signal CLKI when the start signal STA turns low "L" to high "H". The counter 13, when the counter value reaches a predetermined value, supplies a count completion signal TO and cancels the reset signal /RST supplied to the circuit block 20A. The OR gate 14 provides control of the clock signal CLK supplied to the circuit block 20A on the basis of the stop signal STP supplied from the control unit 11A.

The divider 16 divides a clock signal CLKI outputted from the OR gate 14, on the basis of a dividing ratio DIV supplied from the register 17, to generate a clock signal CLK to be supplied to the circuit block 20A. The register 17 stores the dividing ratio DIV supplied from the circuit block 20A and supplies the dividing ratio DIV to the divider 16 and to the reference voltage generating circuit 18. The reference voltage generating circuit 18 generates a reference voltage VREF corresponding to the dividing ratio DIV supplied from the register 17, and supplies such the reference voltage VREF to the monitoring unit 19.

The circuit block 20A is connected at output terminals to input terminals of the controller 11A and monitoring unit 19. The monitoring unit 19 is connected at an output terminal to an input terminal of the controller 11A.

The circuit block 20A includes delay circuit 21 for detecting a delay time which may vary depending on the power-supply voltage VDDV, in addition to the circuit having an ordinary function. The delay circuit 21 provides as its output a clock signal CLK0 which is an intact return of the clock signal CLK supplied from the power-supply control circuit 10C, and a clock signal CLKD obtained by delaying the clock signal CLK through two-stage inverters 21a and 21b.

The monitoring unit 19 detects the delay time of the delay circuit 21 on the basis of the phase difference between the two clock signals CLK0 and CLKD outputted from the delay circuit 21. The monitoring unit 19 outputs a comparison signal CMP of high "H", when the delay time is in a reference range of time.

The monitoring unit 19 includes an EOR (exclusive logical sum gate) 19a which is supplied with the two clock signals CLK0 and CLKD to output a pulse EO having a pulse width which depends on the phase difference between the clock signals CLK0 and CLKD. The monitoring unit 19 also includes a resistor 19b and a capacitor 19c for integrating the pulse EO, and a comparator 19d for comparing the integrated voltage VI with the reference voltage VREF. The other features are the same as those of the first preferred embodiment of FIG. 2.

When the circuit block 20A is in "wake-up" mode, the circuit block 20A is supplied with a clock signal CLK of a lower speed than upon the ordinary operation. The monitoring unit 19 sets a shorter reference time corresponding to the clock signal of a lower speed so as to obtain a larger reference voltage VREF than the reference voltage upon the ordinary operation.

The reference voltage VREF supplied to the monitoring unit 19 is set to a larger value than upon the ordinary operation. Accordingly, the comparison signal CMP outputted from the comparison unit 19 turns to high "H" before the operation speed of the circuit block 20A reaches a predetermined value, i.e., the power-supply voltage VDDV reaches a predetermined value. This allows the circuit block 20A to shift into "operation" mode before the power-supply voltage VDDV reaches the predetermined value. At that time, the clock signal CLK has a lower speed than upon the ordinary operation, so that the circuit block 20A carries out a normal operation on the basis of this clock signal CLK. The other operations are substantially the same as the third preferred embodiment of FIG. 5.

As set forth hereinabove, the LSI of the fourth preferred embodiment includes the reference voltage generating circuit 18 capable of setting the reference voltage VREF for detection of the operation speed of the circuit block 20A in such a manner as to correspond to the dividing ratio DIV of the clock signal CLK. This provides an advantage in that the shortest wake-up time of the circuit block 20A can be set depending on the clock signal CLK.

It will be understood that the present invention is not limited to the above-preferred embodiments but can variously be modified. The variants may be as follows for example:

(a) The circuit configurations of the power-supply control circuit 10A to 10D are merely exemplary ones and can be substituted by any circuit having similar functions;
(b) Although the counter 13 counts the clock signal CLKI to generate a predetermined timing, any other timing circuit than the counter may be used;
(c) Although the monitoring unit 19 converts the pulse width of the pulse EO based on the delay time into the voltage VI for comparison with the reference voltage VREF, any circuit may be used that directly measures the pulse width of the pulse EO by way of example; and
(d) Although the dividing ratio DIV supplied to the register 17 is set from the circuit block 20, the setting may be made from another circuit within the LSI.

What is claimed is:

1. A power supply control circuit performing power saving control to place a circuit block in a power down mode, the circuit block operating using a supply voltage, the power supply control circuit comprising:

a comparator which compares a supply voltage provided to the circuit block with a reference voltage during a wake-up operation mode of the circuit block, and supplies a comparison signal when the supply voltage reaches the reference voltage; and a controller which initiates cancellation of a reset period of the wake-up operation mode of the circuit block responsive to the comparison signal.

2. A power supply control circuit according to claim 1, further comprising:

a counter which counts first clock signals and supplies an operation requesting signal to the circuit block when a predetermined number of the first clock signals are counted, wherein the controller controls the counter to start counting the first clock signals in response to the comparison signal, and wherein the circuit block turns into an in-operation mode canceling the reset period in response to the operation requesting signal.

3. A power supply control circuit according to claim 2, further comprising:

a divider which divides the first clock signals by a dividing ratio to provide second clock signals to be supplied to the circuit block; and a reference voltage generating circuit which generates the reference voltage to be supplied to the comparator in accordance with the dividing ratio.

4. A power supply control circuit according to claim 3, further comprising:

a register which stores the dividing ratio to be supplied to the reference voltage generating circuit and the divider.

5. A power supply control circuit according to claim 3, wherein the circuit block supplies the dividing ratio to the reference voltage generating circuit and the divider.

6. A power supply control circuit according to claim 5, further comprising:

a register which stores the dividing ratio to be supplied to the reference voltage generating circuit and the divider.

7. A power supply control circuit performing power saving control to place a circuit block in a power down mode, the circuit block operating using a supply voltage, the power supply control circuit comprising:

a comparator which compares a subject voltage with a reference voltage during a wake-up operation mode of the circuit block and supplies a comparison signal when the subject voltage reaches the reference voltage;

a controller which initiates cancellation of a reset period of the wake-up operation mode of the circuit block responsive to the comparison signal;

a counter which counts first clock signals and supplies an operation requesting signal to the circuit block when a predetermined number of the first clock signals are counted, wherein the controller controls the counter to start counting the first clock signals in response to the comparison signal, and wherein the circuit block turns into an in-operation mode canceling the reset period in response to the operation requesting signal;

a delay circuit which generates third signals delayed by a predetermined timing with respect to the first clock signals; and a subject voltage generating circuit which generates the subject voltage corresponding to a phase difference between the first and third clock signals.

8. A power supply control circuit according to claim 7, wherein the delay circuit is provided in the circuit block.

9. A power supply control circuit according to claim 8, wherein the delay circuit comprises two serially connected inverters.

10. A power supply control circuit according to claim 7, wherein the subject voltage generating circuit comprises an exclusive OR gate, which is supplied with the first and third clock signals.

11. A power supply control circuit according to claim 10, wherein the subject voltage generating circuit further comprises:

a resistance, connected to an output terminal of the exclusive OR gate; and a capacitor, wherein the resistance and the capacitor integrate an output signal of the exclusive OR gate to provide the subject voltage.

12. A power supply control circuit according to claim 7, wherein as the supply voltage increases, the phase difference between the first and third clock signals decreases.

13. A power supply control circuit according to claim 7, further comprising:

a divider which divides the first clock signals by a dividing ratio to provide second clock signals to be supplied to the circuit block; and a reference voltage generating circuit which generates the reference voltage to be supplied to the comparator in accordance with the dividing ratio.

14. A power supply control circuit according to claim 13, further comprising:

a register which stores the dividing ratio to be supplied to the reference voltage generating circuit and the divider.

15. A power supply control circuit according to claim 13, wherein the circuit block supplies the dividing ratio to the reference voltage generating circuit and the divider.

16. A power supply control circuit according to claim 15, further comprising:

a register which stores the dividing ratio to be supplied to the reference voltage generating circuit and the divider.

17. A semiconductor integrated circuit, comprising:

a circuit block which performs a predetermined operation using a supply voltage; and a power supply control circuit, which performs power saving control to place the circuit block in a power down mode, the power supply control circuit comprising a comparator which compares the supply voltage provided to the circuit block with a reference voltage during a wake-up operation mode of the circuit block, and supplies a comparison signal when the supply voltage reaches the reference voltage, and a controller which initiates cancellation of a reset period of the wake-up operation mode of the circuit block responsive to the comparison signal.

18. A semiconductor integrated circuit according to claim 17, wherein the power supply control circuit further comprises:

a counter which counts first clock signals and supplies an operation requesting signal to the circuit block when a predetermined number of the first clock signals are counted, wherein the controller controls the counter to start counting the first clock signals in response to the comparison signal, and wherein the circuit block turns into an in-operation mode canceling the reset period in response to the operation requesting signal.

19. A semiconductor integrated circuit according to claim 18, wherein the power supply control circuit further comprises:

a divider which divides the first clock signals by a dividing ratio to provide second clock signals to be supplied to the circuit block; and a reference voltage generating circuit which generates the reference voltage to be supplied to the comparator in accordance with the dividing ratio.

20. A semiconductor integrated circuit according to claim 19, wherein the power supply control circuit further comprises:

a register which stores the dividing ratio to be supplied to the reference voltage generating circuit and the divider.

21. A semiconductor integrated circuit according to claim 19, wherein the circuit block supplies the dividing ratio to the reference voltage generating circuit and the divider.

22. A semiconductor integrated circuit according to claim 21, wherein the power supply control circuit further comprises:

a register which stores the dividing ratio to be supplied to the reference voltage generating circuit and the divider.

23. A semiconductor integrated circuit, comprising:

a circuit block which performs a predetermined operation using a supply voltage; and a power supply control circuit, which performs power saving control to place the circuit block in a power down mode, the power supply control circuit comprising a comparator which compares a subject voltage with a reference voltage during a wake-up operation mode of the circuit block, and supplies a comparison signal when the supply voltage reaches the reference voltage, a controller which initiates cancellation of a reset period of the wake-up operation mode of the circuit block responsive to the comparison signal, a counter which counts first clock signals and supplies an operation requesting signal to the circuit block when a predetermined number of the first clock signals are counted, wherein the controller controls the counter to start counting the first clock signals in response to the comparison signal, and wherein the circuit block turns into an in-operation mode canceling the reset period in response to the operation requesting signal, a delay circuit which generates third clock signals delayed by a predetermined timing with respect to the first clock signals, and a subject voltage generating circuit which generates the subject voltage corresponding to the phase difference between the first and third clock signals.

24. A semiconductor integrated circuit according to claim 23, wherein the delay circuit is provided in the circuit block.

25. A semiconductor integrated circuit according to claim 24, wherein the delay circuit comprises two serially connected inverters.

26. A semiconductor integrated circuit according to claim 23, wherein the subject voltage generating circuit comprises an exclusive OR gate, which is supplied with the first and third clock signals.

27. A semiconductor integrated circuit according to claim 26, wherein the subject voltage generating circuit further comprises:

a resistance, connected to an output terminal of the exclusive OR gate; and a capacitor, wherein the resistance and the capacitor integrate an output signal of the exclusive OR gate to provide the subject voltage.

28. A semiconductor integrated circuit according to claim 23, wherein as the supply voltage increases, the phase difference between the first and third clock signals decreases.

29. A semiconductor integrated circuit according to claim 23, wherein the power supply control circuit further comprises:

a divider which divides the first clock signals by a dividing ratio to provide second clock signals to be supplied to the circuit block; and a reference voltage generating circuit which generates the reference voltage to be supplied to the comparator in accordance with the dividing ratio.

30. A semiconductor integrated circuit according to claim 29, wherein the power supply control circuit further comprises:

a register which stores the dividing ratio to be supplied to the reference voltage generating circuit and the divider.

31. A semiconductor integrated circuit according to claim 29, wherein the circuit block supplies the dividing ratio to the reference voltage generating circuit and the divider.

32. A semiconductor integrated circuit according to claim 31, wherein the power supply control circuit further comprises:

a register which stores the dividing ratio to be supplied to the reference voltage generating circuit and the divider.

* * * * *